US012352997B2

(12) United States Patent
Ono et al.

(10) Patent No.: US 12,352,997 B2
(45) Date of Patent: Jul. 8, 2025

(54) LIGHT GUIDE PLATE UNIT AND GAMING MACHINE

(71) Applicant: OMRON Corporation, Kyoto (JP)

(72) Inventors: Takahiro Ono, Kyoto (JP); Junya Fujita, Kyoto (JP); Yoshinori Ito, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/600,759

(22) Filed: Mar. 10, 2024

(65) Prior Publication Data

US 2024/0345310 A1 Oct. 17, 2024

(30) Foreign Application Priority Data

Apr. 13, 2023 (JP) ................................. 2023-065860

(51) Int. Cl.
| | |
|---|---|
| G02B 6/00 | (2006.01) |
| A63F 9/24 | (2006.01) |
| F21V 8/00 | (2006.01) |
| G02B 6/42 | (2006.01) |

(52) U.S. Cl.
CPC .............. G02B 6/0065 (2013.01); A63F 9/24 (2013.01); G02B 6/006 (2013.01); G02B 6/4239 (2013.01); A63F 2009/2454 (2013.01)

(58) Field of Classification Search
CPC .... G02B 6/0065; G02B 6/4239; G02B 6/006; A63F 9/24; A63F 2009/2454
See application file for complete search history.

(56) References Cited

U.S. PATENT DOCUMENTS

| 10,394,388 | B2 * | 8/2019 | Smith ................ H03K 17/9627 |
| 10,962,701 | B2 * | 3/2021 | Vasylyev ............... G02B 6/001 |
| 11,754,771 | B1 * | 9/2023 | Hu .......................... G06F 3/044 |
| | | | 345/174 |
| 11,953,714 | B2 * | 4/2024 | Ono ...................... G02B 6/0076 |
| 2014/0226361 | A1 * | 8/2014 | Vasylyev .............. G02B 6/0025 |
| | | | 362/609 |
| 2016/0379435 | A1 * | 12/2016 | Muraoka .............. G02B 6/0038 |
| | | | 273/143 R |

FOREIGN PATENT DOCUMENTS

| JP | 2016202492 | 12/2016 |
| JP | 2023023545 | 2/2023 |

* cited by examiner

*Primary Examiner* — Robert J May
(74) *Attorney, Agent, or Firm* — JCIPRNET

(57) ABSTRACT

A light guide plate unit includes: a first light guide plate (11) that is a light guide plate having a glass layer, and has the glass layer on a light exit surface of a light guide plate body (D); a light source (14), located on a side surface of the first light guide plate (11) and supplying light into the light guide plate body (D); and a housing (30). The housing (30) has an opening (32a). The first light guide plate (11) is disposed, so that the side of the glass layer faces the opening (32a) of the frame (32) to block the opening (32a).

6 Claims, 4 Drawing Sheets

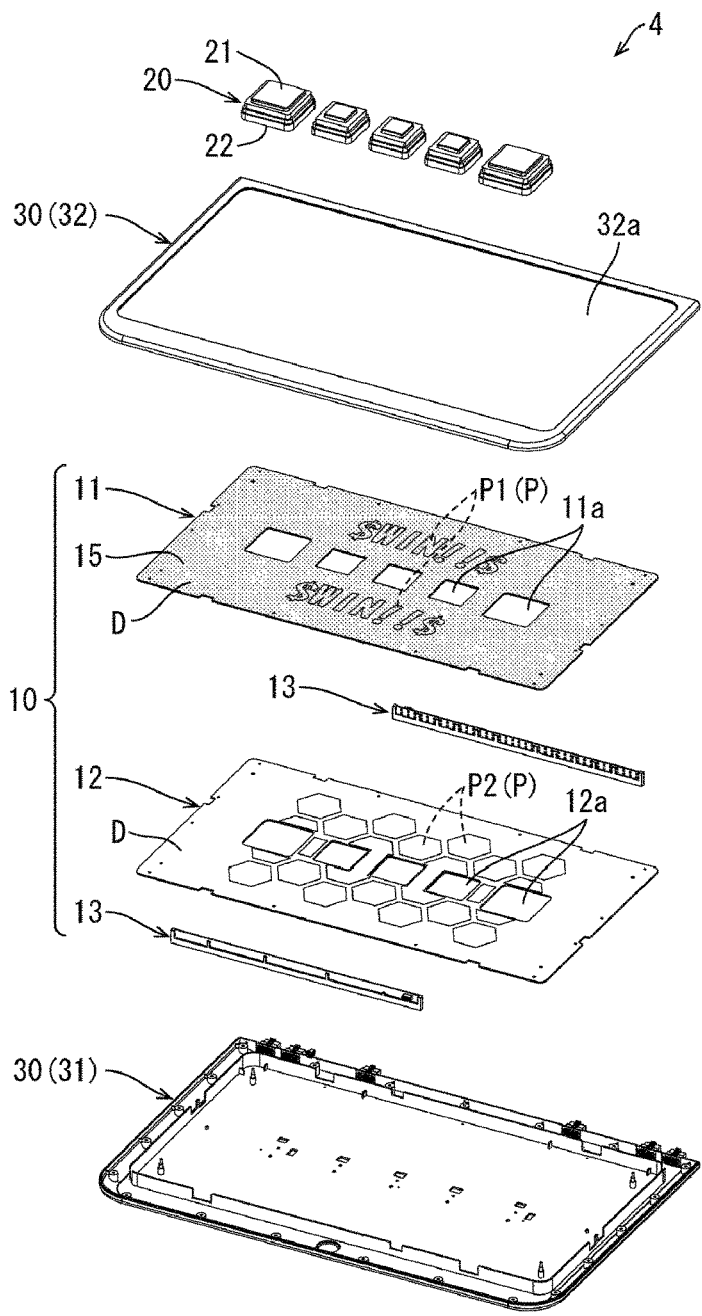
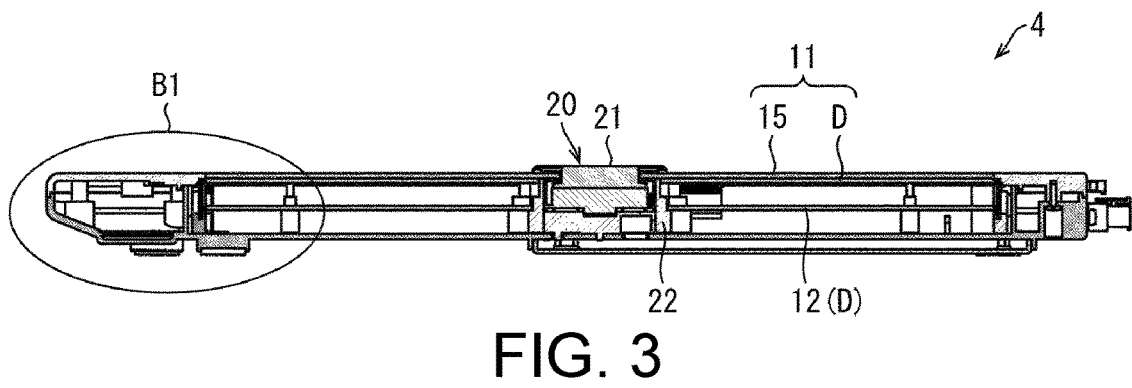
FIG. 2
FIG. 3

LIGHT GUIDE PLATE UNIT AND GAMING MACHINE

CROSS-REFERENCE TO RELATED APPLICATION

This application claims the priority benefit of Japan application no. 2023-065860, filed on Apr. 13, 2023. The entirety of the above-mentioned patent application is hereby incorporated by reference herein and made a part of this specification.

BACKGROUND

Technical Field

The invention relates to a light guide plate unit and a gaming machine.

Description of Related Art

Some gaming machines, such as pachinko machines, pachislot machines, slot machines, and gaming machines, are equipped with light guide plate units. The light guide plate unit includes a light guide plate and a light source supplying light to the light guide plate. By applying fine machining of any arbitrary pattern to the light guide plate, the pattern is illuminated by supplying light from a light source into the light guide plate.

For example, Patent Document 1 discloses a gaming machine including a light guide plate unit. In addition, Patent Document 2 discloses a light guide plate unit (operation unit) in which a switch is mounted.

PRIOR ART DOCUMENT(S)

Patent Document(s)

[Patent Document 1] Japanese Laid-open No. 2016-202492
[Patent Document 2] Japanese Laid-open No. 2023-023545

A light guide plate is a resin component formed by a transparent resin, such as acrylic or polycarbonate. Therefore, in the case of a configuration where a person directly touches the surface of the light guide plate, due to the attachment of sebum, the visibility may be affected. In addition, when a chemical, such as a cleaner, is used to wipe off sebum, the light guide plate may turn white due to chemical reaction, etc. Whitening may also occur in the case where alcohol is used for disinfection.

The light guide plate unit disclosed in Patent Document 1 is disposed in a space on the inner side covered by a glass unit in the gaming machine. As the player does not directly touch the light guide plate, there is no such issue.

In the light guide plate unit disclosed in Patent Document 2, by covering the light guide plate from the above by using a transparent top panel, the operator is unable to directly touch the light guide plate.

However, since the top panel and the light guide plate are separate components, in such configuration, the number of parts increases, and the cost necessarily increases. In addition, since the top panel is spaced apart from the light guide plate at an interval, the thickness of the light guide plate unit increases. In the light guide plate unit, since it is necessary to increase the number of light guide plates to diversify the patterns that can be switched and displayed, a thin configuration may be adopted.

The invention provides a light guide plate unit that can easily wipe off dirt by using a chemical, and can have a fewer number of parts and a reduced thickness.

SUMMARY

A light guide unit according to an aspect of the invention includes: a light guide plate having a glass layer, wherein the light guide plate having the glass layer has a light guide plate body formed by a transparent resin, fine machining is applied to a surface on a side opposite to a light exit surface in the light guide plate body, and the light guide plate having the glass layer has the glass layer on the light exit surface; a light source, located on a side surface of the light guide plate having the glass layer and supplying light into the light guide plate body; and a housing, supporting the light guide plate having the glass layer and the light source. The housing has an opening. The light guide plate having the glass layer is disposed so that a side of the glass layer faces the opening to block the opening.

BRIEF DESCRIPTION OF THE DRAWINGS

FIG. 2 is an exploded perspective view illustrating the operation unit according to the embodiment.
FIG. 3 is a vertical cross-sectional view illustrating the operation unit according to the embodiment taken along a lateral direction.

DESCRIPTION OF THE EMBODIMENTS

Figure 1:
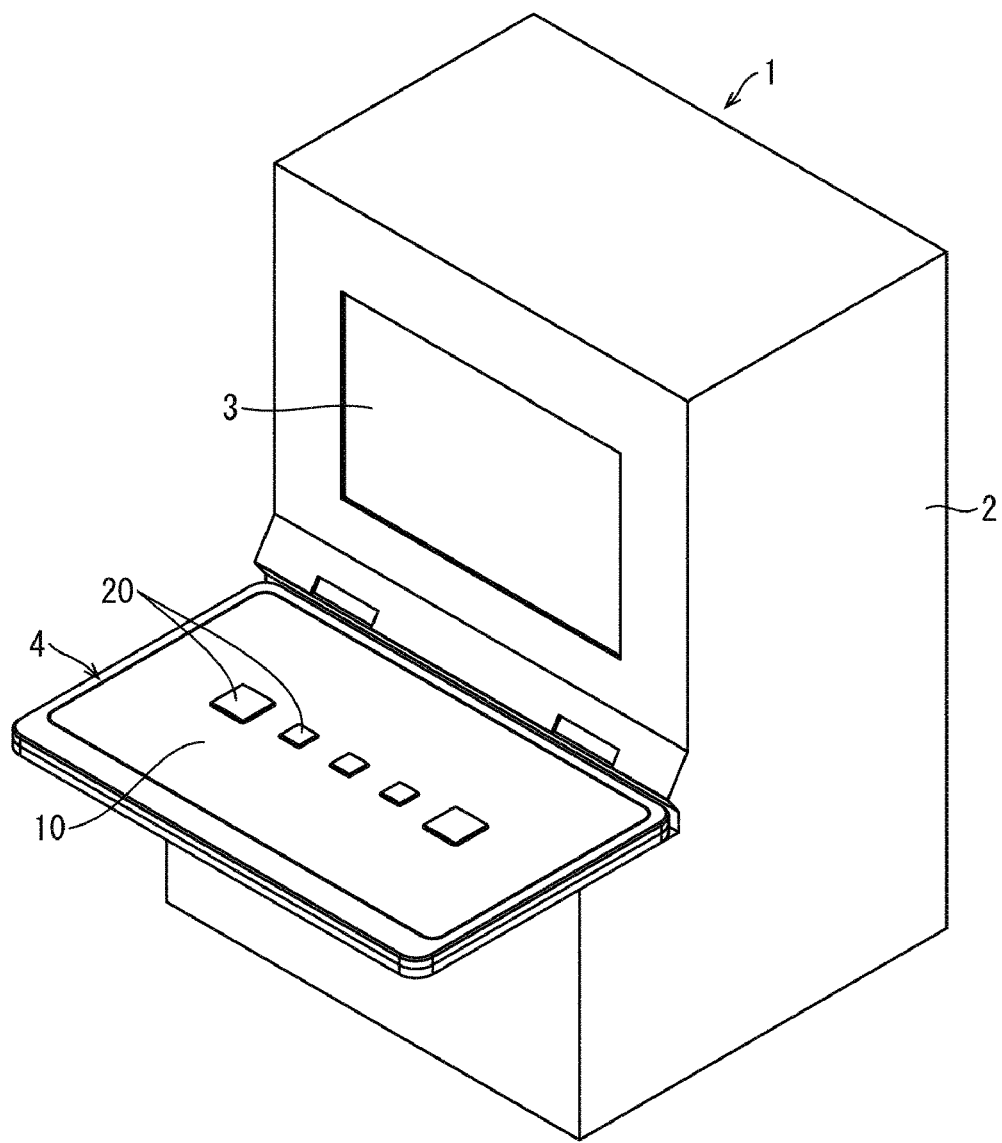
FIG. 1 is a schematic perspective view illustrating an operation unit and a gaming machine according to an embodiment.

A light guide unit according to an aspect of the invention includes: a light guide plate having a glass layer, wherein the light guide plate having the glass layer has a light guide plate body formed by a transparent resin, fine machining is applied to a surface on a side opposite to a light exit surface in the light guide plate body, and the light guide plate having the glass layer has the glass layer on the light exit surface; a light source, located on a side surface of the light guide plate having the glass layer and supplying light into the light guide plate body; and a housing, supporting the light guide plate having the glass layer and the light source. The housing has an opening. The light guide plate having the glass layer is disposed so that a side of the glass layer faces the opening to block the opening.

According to the configuration, even if the player (operator) directly contact the front surface of the light guide plate having the glass layer and the sebum is attached, the sebum can be easily wiped off by using a chemical, such as a cleaner. In addition, since the light guide plate body and the glass layer are integrally formed, compared with the configuration in which the cover member is provided as a separate component, the number of parts is decreased, and the assembling man hours can also be reduced. In addition, the thickness is reduced.

According to the light guide unit according to an aspect of the invention, it may also be configured that an adhesive layer is provided between the light guide plate body and the glass layer. Accordingly, since the light guide plate body and the glass layer are adhered, the distance between the light guide plate body and the glass layer can be easily maintained uniformly, and there is hardly any interference fringes.

In such case, it may also be further configured that the adhesive layer is provided throughout an entirety between the light guide plate body and the glass layer. Accordingly, because of the entire adhesion, it is even harder to generate interference fringes.

According to the light guide unit according to an aspect of the invention, it may also be configured that a surface on a periphery of the opening in the housing and a surface of the light guide plate having the glass layer on the side of the glass layer are flush with each other. Accordingly, since the housing and the light guide plate having the glass are flush with each other, swiping cleaning is easy.

According to the light guide unit according to an aspect of the invention, it may also be configured that the operation unit further includes: The light guide plate unit as claimed in claim 1, comprising:

one or more other light guide plates, disposed in parallel with the light guide plate having the glass layer on a side opposite to the glass layer of the light guide plate having the glass layer; and another light source supplying light into each of the one or more other light guide plates. Accordingly, since multiple light guide plates are provided, more complicated and diversified display can be performed.

According to the light guide unit according to an aspect of the invention, it may also be configured that the light guide plate having the glass layer has a through hole, and the light guide plate unit further includes a switch part located at the through hole and receiving an operation. Accordingly, in addition to performing display, the operation unit having an operation function of receiving an operation can be configured.

A gaming machine according to an aspect of the invention includes the light guide plate according to an aspect of the invention. Accordingly, the gaming machine can be provided.

According to an aspect of the invention, it is possible to realize a light guide plate unit that can easily wipe off dirt by using a chemical, and can have a fewer number of parts and a reduced thickness.

In the following, embodiments (referred to as "the embodiment" in the following) according to an aspect of the invention is described based on the drawings. However, the embodiment described below is merely an illustration of the invention in all respects. It goes without saying that various improvements and modifications can be made without departing from the scope of the invention. That is, in the implementation of the invention, specific configurations depending on the embodiments may be adopted as appropriate.

1. Application Example

Figure 4:
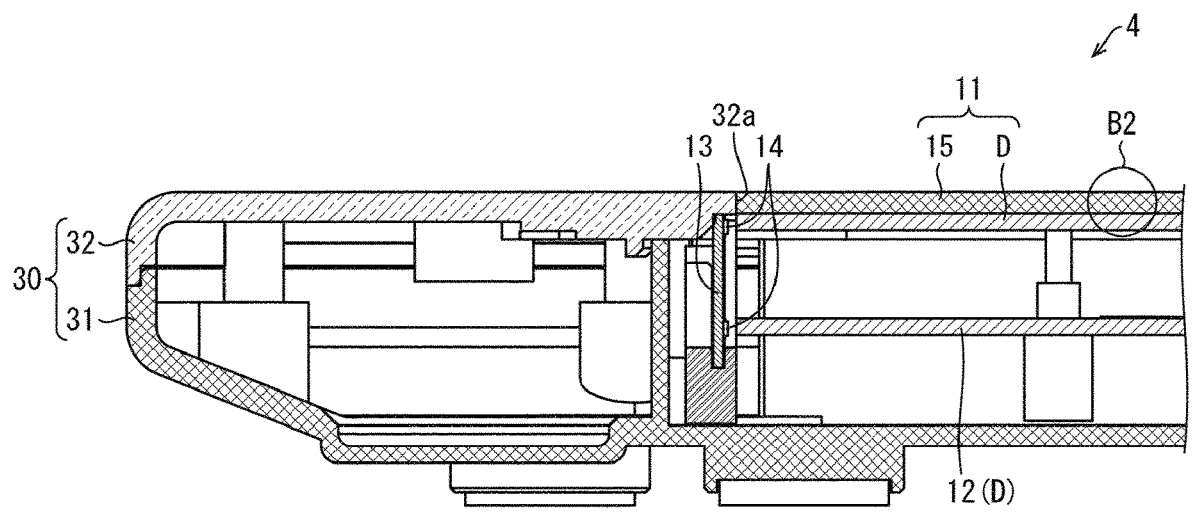
FIG. 4 is an enlarged view of a region B1 shown in FIG. 3.

Firstly, an example of the situation where the invention is applied is described by using FIGS. 1, 2, and 4. As shown in FIG. 1, in a gaming machine 1, an operation unit 4 as a light guide plate unit is disposed. The operation unit 4 includes a display part 10 and a switch part 20 disposed in the display part 10. The switch part 20 is disposed, so that a portion of the display part 10 is hollowed out.

As shown in FIGS. 2 and 4, the display part 10 includes a first light guide plate 11 and a second light guide plate 12.

As shown in FIG. 2, fine machining of a pattern P (P1, P2) representing any text or design is applied to a surface on a side opposite to the light exit surface of each light guide plate body D of the first light guide plate 11 and the second light guide plate 12, and a light source 14 is each disposed on a lateral surface of each light guide plate body D. By lighting up the light source 14, the pattern P (P1, P2) formed in each light guide plate body D is illuminated.

As shown in FIG. 4, between the first light guide plate 11 and the second light guide plate 12, the first light guide plate 11 is a light guide plate having a glass layer having a surface laminated glass 15 on the light exit surface of the light guide plate body D. The first light guide plate 11 is disposed, so that the side of the surface laminated glass 15 faces an opening 32a of a frame-like frame 32 to block the opening 32a.

In the configuration, the front surface of the first light guide plate 11 located on the outer surface of the operation unit 4 is formed by the surface laminated glass 15 and has a high resistance against chemicals. Therefore, even if the player (operator) directly touches the front surface of the first light guide plate 11 and sebum is attached, the sebum can still be wiped off easily by using a chemical. In addition, compared with the case where a transparent cover covering the display part 10, such as a top panel, is provided separately, the number of parts is reduced, and no gap is required between the top panel and the light guide plate. Therefore, the thickness is reduced.

The operation unit 4 can also be used in an operation unit of an industrial machine, a consumer machine, etc. The light guide unit may also have a display function only and not have the switch part 20.

2. Configuration Example

In the following, an embodiment for an aspect of the invention is exemplified based on FIGS. 1 to 5.

(Gaming Machine)

FIG. 1 is a schematic perspective view illustrating the operation unit 4 and the gaming machine 1 according to the embodiment. As shown in FIG. 1, in the gaming machine 1, a display device 3 is provided on the front surface side of a gaming machine housing 2, and the operation unit 4 is disposed as the light guide plate unit below the display device 3. The operation unit 4 includes the display part 10 in which a light guide plate is used and the switch part 20 disposed in the display part 10. The gaming machine 1, for example, is a pachinko machine, a pachislot machine, a slot machine, or a gaming machine, etc.

(Configuration of the Operation Unit)

Figure 5:
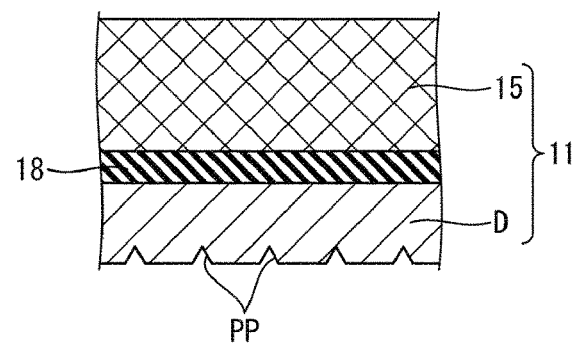
FIG. 5 is an enlarged view of a region B2 shown in FIG. 4.

FIG. 2 is an exploded perspective view illustrating the operation unit 4 according to the embodiment. FIG. 3 is a vertical cross-sectional view illustrating the operation unit 4 according to the embodiment taken along a lateral direction. FIG. 4 is an enlarged view of a region B1 shown in FIG. 3. FIG. 5 is an enlarged view of a region B2 shown in FIG. 4.

As shown in FIGS. 1 and 2, the operation unit 4 includes the display part 10, the switch part 20, and a housing 30.

In the embodiment, the display part 10 is arranged in a rectangular shape, and, at the center of the lateral direction of the display part 10, five switch parts 20 are arranged and disposed along a longitudinal direction of the display part 10.

As shown in FIG. 2, the switch part 20 is, for example, a press button switch. The switch part 20 is configured, so that a top surface part 21 biased upward moves up and down with respect to the case 22. In the operation unit 4, an input detection part (not shown) that detects the operation with respect to the switch part 20 is provided.

In the case where the gaming machine 1 is a slot machine, the switch part 20 is assigned a role, such as a bet button for specifying a bet (number of bet) or a spin button for indicating that a spin starts.

The display part 10 includes the first light guide plate 11, the second light guide plate 12, and light guide plate lighting substrates 13. The first light guide plate 11 is a light guide plate having a glass layer. Both of the first light guide plate 11 and the second light guide plate 12 include a light guide plate body D that is a transparent and thin resin part formed by a transparent resin, such as acrylic or polycarbonate.

As shown in FIG. 3, the first light guide plate 11 is located on the outer surface side of the operation unit 4, and the second light guide plate 12 is located on the back surface side of the first light guide plate 11. In the first light guide plate 11 and the second light guide plate 12, the pattern P (P1, P2) representing any text or design is applied to the back surface of the light guide plate body D through fine machining. Specifically, fine prisms PP are formed (see FIG. 5) in the region of the pattern P (P1, P2). The front surface side of the light guide plate D, which serves as the side opposite to the back surface where the prisms PP are formed, serves as a light exit surface of the first light guide plate 11 and the second light guide plate 12. In the first light guide plate 11 and the second light guide plate 12, the light exit surfaces are disposed in parallel toward the side of the player.

As shown in FIG. 4, among the two, the second light guide plate 12 is formed by the light guide plate body D only. However, the first light guide plate 11 disposed on the outer surface side of the operation unit 4 is a light guide plate having a glass layer including the surface laminated glass 15.

The first light guide plate 11 is disposed, so that the side having the surface laminated glass 15 is disposed to face the outer surface side of the operation unit 4. The surface laminated glass 15, for example, has a thickness of 2 mm to 3 mm, and is adhered to the light exit surface of the light guide plate body D of the first light guide plate 11 by using an adhesive, etc.

As shown in FIG. 5, in the embodiment, an adhesive layer 18 is located between the light guide plate body D and the surface laminated glass 15 in the first light guide plate 11. The adhesive forming the adhesive layer 18 may be colorless and transparent.

The adhesive layer 18 may be provided throughout an entirety between the light guide plate body D and the surface laminated glass 15 in the first light guide plate 11. This is because an air layer is present between the light guide plate body D and the surface laminated glass 15 in the first light guide plate 11, and when the side of the surface laminated glass 15 is pressed, etc., and the distance between the light guide plate body D and the surface laminated glass 15 in the first light guide plate 11 decreases to be less than a predetermined distance, rainbow-colored interference fringes called Newton's rings are visually recognizable. The Newton's rings are formed by multiple rings expanding concentrically with a closest portion as the center. By adhering the entireties of the light guide plate body D and the surface laminated glass 15 in the first light guide plate 11 by using an adhesive, the occurrence of the interference fringes can be prevented.

In addition, in order to keep the distance between the light guide plate body D and the surface laminated glass 15 in the first light guide plate 11 constant, a transparent spacer, etc., may also be mixed into the adhesive serving as the adhesive layer 18. Although the example of FIG. 2 illustrates the configuration including one second light guide plate 12, multiple second light guide plates 12 may also be provided.

As shown in FIG. 2, at the positions where the switch parts 20 are disposed in the first light guide plate 11 and the second light guide plate 12, through holes 11a, 12a for disposing the switch parts 20 are formed. The through holes 12a in the second light guide plate 12 accommodate cases 22 of the switches 29 on the inner side, and the through holes 11a in the first light guide plate 11 accommodate, on the inner side, the top surface parts 21 of the switch parts 20. Therefore, the through holes 12a are formed to be greater than the through holes 11a (see FIG. 3). The switch parts 20 receiving an operation are located at the through holes in the first light guide plate 11 and the second light guide plate 12.

A pair of light guide plate lighting substrates 13 are provided. The pair of light guide plate lighting substrates 13 are disposed on two side surfaces (end surfaces in the thickness direction) extending in the longitudinal direction in the first light guide plate 11 and the second light guide plate 12. The light sources 14 are disposed on a surface facing the side surfaces of the light guide plate body D of the first light guide plate 11 and the second light guide plate 12 (see FIG. 4).

As an example of the light source 14, an LED can be used. In the case of a full-color LED, the lighting colors of the first light guide plate 11 and the second light guide plate 12 can be changed into various colors. The light guide plate lighting substrate 13 is configured to be able to independently drive each of the light sources 14 that are mounted.

The display part 10 and the switch parts 20 are supported by the housing 30. The housing 30 supports the first light guide plate 11, the second light guide plate 12, the light guide plate lighting substrates 13, and the switch parts 20. The housing 30 includes a bottom base 31 and a frame 32. The bottom base 31 is a housing covering the back surface of the operation plate unit 4. The frame 32 is frame-shaped and has the opening 32a on the inner side, the opening 32a being fit with the first light guide plate 11. The bottom base 31 and the frame 32 are both formed by an opaque material.

The switch parts 20 are formed on the bottom base 31, and the second light guide plate 12 and the first light guide plate 11 are disposed in order thereabove. In addition, at predetermined positions on the sides of the first light guide plate 11 and the second light guide plate 12 above the bottom base 31, the two light guide plate lighting substrates 13, 13 are disposed. From the above, the frame-like frame 32 is fit with the bottom base 31, and the frame 32 and the bottom base 31 are fixed by using screws, etc., (not shown).

As shown in FIG. 4, in the assembled state, the first light guide plate 11 is located on the inner side of the opening 32a of the frame 32. That is, the first light guide plate 11 is disposed, so that the side of the surface laminated glass 15 faces the opening 32a of the frame 32 to block the opening 32a. Moreover, in the embodiment, the front surface of the first light guide plate 11 on the side of the surface laminated glass 15 is provided to be flush with the front surface of the frame 32.

In addition, according to the embodiment, in the first light guide plate 11, the side surfaces of the light guide plate body D and the surface laminated glass 15 are aligned and located in the same surface. Moreover, at the edge of the opening part 32a in the frame 32, a stepped part in which a portion facing the light guide plate body D is one step lower than a portion facing the surface laminated glass 15 is formed. The light guide plate lighting substrates 13 and the light sources 14 are disposed by using the stepped part. Accordingly, the light sources 14 are covered by the frame 32, and the light sources 14 are prevented from being directly visually recognized by the player.

(Light Effects According to the Operation Unit)

In the operation unit 4, when the light source 14 facing the side surface of the light guide plate body D in the first light guide plate 11 is lit up, the light is incident from the end surface of the light guide plate body D in the first light guide plate 11. The incident light is propagated inside the light guide plate body D in the first light guide plate 11 while being totally reflected repetitively. The light path of a portion of the light is reflected and changed in the prisms PP formed by fine machining, and the portion of the light is emitted from the light exit surface of the light guide plate body D in the first light guide plate 11. The emitted light passes through the transparent adhesive layer 18 and the surface laminated glass 15 in order, and is emitted from the first light guide plate 11. Accordingly, the pattern P1 shaped on the light guide plate body D in the first light guide plate 11 is illuminated, and the text or design drawn in the pattern P1 is displayed as a light image on the display part 10.

When the light source 14 facing the side surface of the second light guide plate 12 is lit up, like the light guide plate body D in the first light guide plate 11, the light incident into the second light guide plate 12 travels in the second light guide plate 12 while being totally reflected, and the text or design drawn in the pattern P2 is displayed as a light image on the display part 10.

The light guide plate lighting substrate 13 is configured to be able to independently drive each of the light sources 14 that are mounted. Accordingly, it is possible to light up the light source 14 corresponding to the light guide plate body D in the first light guide plate 11 only and illuminate only the pattern P1, or it is possible to light up the light source 14 corresponding to the second light guide plate 12 only and illuminate only the pattern P2. Moreover, it is also possible to light up both of the light sources 14 corresponding to the light guide plate body D in the first light guide plate 11 and the light source 14 corresponding to the second light plate 12 to display a light image combining the text or designs drawn in the patterns P1, P2.

Figure 6A:
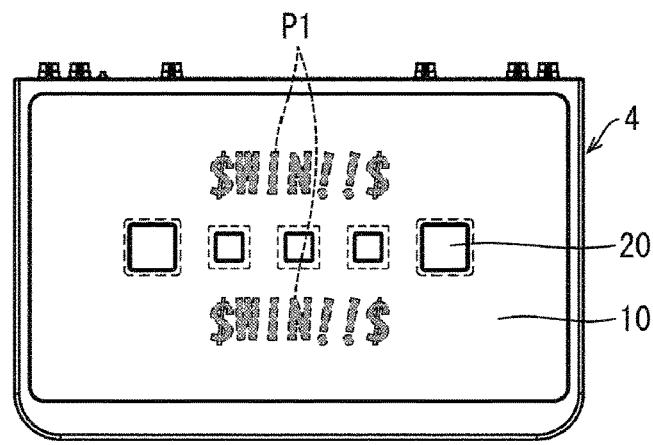
FIGS. 6A to 6C are schematic views illustrating light effects of a display part in the operation unit according to the embodiment.
Figure 6B:
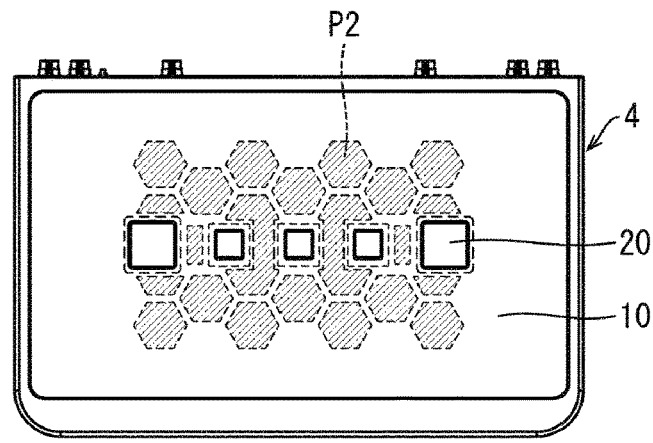
Figure 6C:
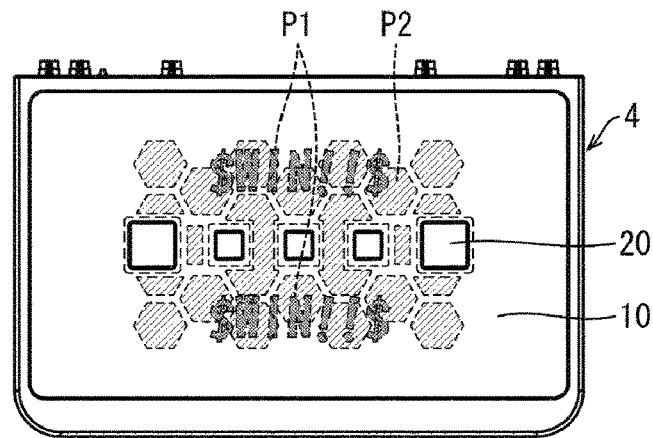

FIGS. 6A to 6C are schematic views illustrating light effects of the display part 10 in the operation unit 4 according to the embodiment. In FIG. 6A, only the light source 14 corresponding to the light guide plate body D in the first light guide plate 11 is lit up. In FIG. 6B, only the light source 14 corresponding to the second light guide plate 12 is lit up. In FIG. 6C, both the light source 14 corresponding to the light guide plate body D in the first light guide plate 11 and the light source 14 corresponding to the second light guide plate 12 are lit up. By increasing the number of the light guide plate bodies D included in the display part 10, more complicated and diversified light images can be displayed.

Effects

In the operation unit 4 according to the configuration, the first light guide plate 11 located on the outer surface side of the operation unit 4 is a light guide plate having a glass layer including the surface laminated glass 15 on the light exit surface side (outer surface side of the operation unit 4) of the light guide plate body D. The first light guide plate 11 is disposed, so that the side of the surface laminated glass 15 faces the opening 32a of the frame 32 to block the opening 32a.

That is, the front surface of the first light guide plate 11 located on the outer surface of the operation unit 4 is configured by using the surface laminated glass 15 having a high resistance against chemicals. Therefore, in the case where the player (operator) directly touches the front surface of the first light guide plate 11 and sebum is attached, the sebum can be easily wiped off by using a chemical, such as a cleaner. Since the surface laminated glass 15 is made of glass, even if the surface laminated glass 15 is wiped and cleaned by using a chemical, such as a cleaner, whitening like a resin material does not occur.

In addition, since the light guide plate body D and the surface laminated glass 15 are integrally formed, compared with the configuration in which a cover member, such as a top panel, as a separate component from the light guide plate body D is provided, the number of parts is decreased, and the assembling man hours can also be reduced. As a result, the cost is reduced.

Moreover, in the case where the cover member is a separate component, the cover member is spaced apart from the light guide plate body D with a gap, so the thickness of the light guide plate unit increases. In the above configuration, the light guide plate body D and the surface laminated glass 15 are integrally formed, so the thickness is reduced. In the operation unit, it is necessary to increase the number of the light guide plate bodies D to diversify the patterns that can be switched and displayed, and such needs can be coped with.

3. Modified Examples

Although the embodiments of the invention have been described in detail above, the descriptions are merely illustrative of the invention in all respects. It goes without saying that various improvements and modifications can be made without departing from the scope of the invention. For example, the following modifications are possible. Below, the same symbol is used for the same component as the above embodiment, and description is omitted suitably about the same point as the above embodiment. The following modified examples can be combined as appropriate.

For example, although the operation unit 4 including the switch parts 20 is shown, a display unit with the display part 10 but without the switch parts 20 may also be provided. In addition, in the first light guide plate 11 that is a light guide plate having a glass layer, the surface laminated glass 15 and the light guide plate body D have the same size. However, it may also be configured that the surface laminated glass 15 is slightly larger than the light guide plate body D.

The invention is not limited to the embodiments described above, and various changes can be made within the scope of the claims. Embodiments obtained by appropriately combining technical means disclosed in different embodiments are also included in the technical scope of the invention.

What is claimed is:
1. A light guide plate unit, comprising:
 a first light guide plate, having:
  a first light guide plate body, formed by a transparent resin and having a light exit surface, wherein a surface on a side opposite to the light exit surface is provided with a prism;
  a glass layer, disposed on a side of the light exit surface; and
  an adhesive layer, disposed between the first light guide plate body and the glass layer, a first light source, located on a side surface of the first light guide plate and supplying light into the first light guide plate body;

a housing, supporting the first light guide plate and the first light source; and a second light guide plate, disposed in parallel with the first light guide plate, wherein the housing has an opening, and the first light guide plate is disposed so that a side of the glass layer faces the opening to block the opening.

2. The light guide plate unit as claimed in claim 1, wherein the adhesive layer is provided throughout an entirety between the first light guide plate body and the glass layer.

3. The light guide plate unit as claimed in claim 1, wherein a surface on a periphery of the opening in the housing and a surface of the first light guide plate on the side of the glass layer are flush with each other.

4. The light guide plate unit as claimed in claim 1, wherein a plurality of the second light guide plates is provided, being disposed in parallel with the first light guide plate on a side opposite to the glass layer of the first light guide plate; and a second light source is provided, supplying light into each of the plurality of the second light guide plates.

5. The light guide plate unit as claimed in claim 1, wherein the first light guide plate has a through hole, and the light guide plate unit further comprises a switch part located at the through hole and receiving an operation.

6. A gaming machine, comprising the light guide plate unit as claimed in claim 1.

* * * * *